US009395463B2

United States Patent
Cuevas et al.

(10) Patent No.: US 9,395,463 B2
(45) Date of Patent: Jul. 19, 2016

(54) EM PROCESSING USING FIELD RATIOS

(71) Applicant: Schlumberger Technology Corporation, Sugar Land, TX (US)

(72) Inventors: Nestor Cuevas, Milan (IT); Ping Zhang, Albany, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/420,839

(22) PCT Filed: Aug. 9, 2013

(86) PCT No.: PCT/US2013/054348
§ 371 (c)(1),
(2) Date: Feb. 10, 2015

(87) PCT Pub. No.: WO2014/026116
PCT Pub. Date: Feb. 13, 2014

(65) Prior Publication Data
US 2015/0204997 A1     Jul. 23, 2015

Related U.S. Application Data

(60) Provisional application No. 61/681,777, filed on Aug. 10, 2012.

(51) Int. Cl.
*G01V 3/30* (2006.01)
*G01V 3/26* (2006.01)
*G01V 3/38* (2006.01)

(52) U.S. Cl.
CPC .. *G01V 3/26* (2013.01); *G01V 3/30* (2013.01); *G01V 3/38* (2013.01)

(58) Field of Classification Search
CPC ......................................................... G01V 3/30
USPC ......................................................... 324/338
See application file for complete search history.

(56) References Cited

U.S. PATENT DOCUMENTS 6,294,917 B1   9/2001   Nichols
7,852,087 B2   12/2010  Wilt et al.
(Continued)

OTHER PUBLICATIONS

International Search Report and the Written Opinion for International Application No. PCT/US2013/054348 dated Nov. 28, 2013.
(Continued)

*Primary Examiner* — Bot Ledynh
(74) *Attorney, Agent, or Firm* — Micheal Dae

(57) ABSTRACT

Electromagnetic (EM) survey processing comprising operating an electronic device to model expected EM field components to be measured by an EM apparatus associated with a subterranean formation, wherein the EM apparatus comprises at least one EM source and at least one EM receiver. The electronic device may be operated to determine one or more ratios of the modeled EM field components. The at least one EM source may be operated to emit an EM signal into the subterranean formation, and the at least one EM receiver may be operated to measure actual EM field components of the EM signal. The electronic device may then be operated to compare the one or more ratios of the modeled EM field components with one or more ratios of the actual EM field components. The one or more ratios of the modeled EM field components may then be updated based on the comparison.

20 Claims, 13 Drawing Sheets

(56) References Cited

U.S. PATENT DOCUMENTS

| | | | |
|---|---|---|---|
| 7,991,553 B2 | 8/2011 | Alumbaugh et al. | |
| 8,188,749 B2 | 5/2012 | Wilt et al. | |
| 2010/0259268 A1 | 10/2010 | Zhang et al. | |
| 2014/0132272 A1 | 5/2014 | Cuevas et al. | |

OTHER PUBLICATIONS

Baranwal, et al. "3-D Modelling Study of Borehole-seafloor Marine CSEM for Shallow Water Case," 71st EAGE Conference & Exhibition, Amsterdam, The Netherlands, Jun. 8-11, 2009, 5, pp. 3175-3179.

Kaufman "The electric field in a borehole with casing," GEOPHYSICS, vol. 55, No. 1, Jan. 1990, pp. 29-38.

Kong, et al. "Casing effects in the sea-to borehole electromagnetic method," GEOPHYSICS, vol. 74, No. 5, Sep.-Oct. 2009, pp. F77-F87.

Liu, et al. "Frequency-domain 3D Borehole-surface Electromagnetic Modeling by the Volume Integral Equation Method," 70th EAGE Conference & Exhibition, Rome, Italy, Jun. 9-12, 1990. 5 pages.

US 9,395,463 B2

EM PROCESSING USING FIELD RATIOS

BACKGROUND OF THE DISCLOSURE

Surface-to-borehole (STB) and borehole-to-surface (BTS) electromagnetic (EM) measurements may be sensitive to the presence of resistive targets. For example, various examples of STB and BTS numerical simulations exist where the response of the target provides useful resolution of hydrocarbon reservoirs in exploration and monitoring scenarios. However, a metal casing in the STB or BTS borehole may provide a highly conductive medium that yields current channeling along the length of the casing. This may result in an additive contribution to measured EM fields due to currents induced on, and leaking out of, the surface of the casing.

Finite size, three-dimensional, conductivity inhomogeneities in the shallow subsurface, known as karsts, may also yield channeling of the current density. The channeling phenomena may be described to first order as an accumulation of charges at the boundaries of the 3D karsts, which may effectively yield secondary sources at the position of the karsts. In turn, the secondary sources may bias the EM fields measured away from the primary source, both on the surface of the Earth as well as downhole.

Overburden structures may also effect STB and/or BTS EM measurements. For example, hydrocarbon targets may be located at depth, and little or no information about electrical properties of the overburden may be collected. However, the resistivity distribution of the overburden may affect the ability to extract accurate geological information at depth. Lack of knowledge about the overburden resistivity may introduce geological noise to STB and/or BTS data, which in turn may affect the ability of imaging hydrocarbon targets.

SUMMARY OF THE DISCLOSURE

The present disclosure introduces a method comprising operating an electronic device to model expected electromagnetic (EM) field components to be measured by an EM apparatus associated with a subterranean formation, wherein the EM apparatus comprises an EM source and an EM receiver. The electronic device is further operated to determine a ratio of the modeled EM field components. The EM source is operated to emit an EM signal into the subterranean formation, and the EM receiver is operated to measure actual EM field components of the EM signal. The electronic device is further operated to compare the ratio of the modeled EM field components with a ratio of the actual EM field components, and then update the ratio of the modeled EM field components based on the comparison.

The present disclosure also introduces an apparatus comprising an electromagnetic (EM) apparatus associated with a subterranean formation and comprising an EM source and an EM receiver, wherein the EM source is operable to emit an EM signal into the subterranean formation, and wherein the EM receiver is operable to measure actual EM field components resulting from the EM signal traversing the subterranean formation. The apparatus further comprises an electronic device operable to: model expected EM field components to be measured by the EM apparatus; determine a ratio of the modeled EM field components; compare the ratio of the modeled EM field components with a ratio of actual EM field components measured by the EM receiver; and update the ratio of the modeled EM field components based on the comparison.

BRIEF DESCRIPTION OF THE DRAWINGS

The present disclosure is to be understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
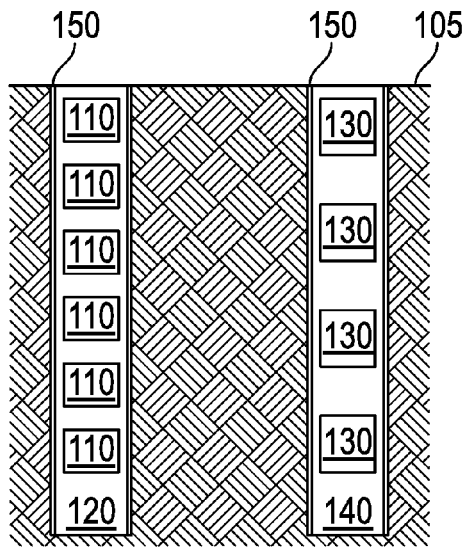
FIG. 1 is a schematic view of an example EM arrangement according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure introduces one or more aspects of STB and BTS EM survey processing using ratios of modeled and measured EM fields, such as to remove the effect of metal casings, karsts, and/or unknown overburden. For example, the present disclosure introduces various methods that may individually and/or collectively adjust for the effects described above by, for example, analyzing the ratio between components of electric fields, and/or between components of electric and magnetic fields, rather than the electric or magnetic fields alone. However, other methods are also within the scope of the present disclosure.

With STB, BTS, and surface EM surveys, a series of electric/magnetic sources and receivers may be deployed in the well(s) and/or on the surface/sea bottom. One or more such sources (which may also be referred to herein as "transmitters") may broadcast one or more EM signals, such as a sinusoid or square wave, through the earth to be detected by the receivers. The galvanic and/or EM coupling from the array of measurements may be utilized for formation resistivity imaging from the well(s) outwards into the reservoir.

Figure 2:
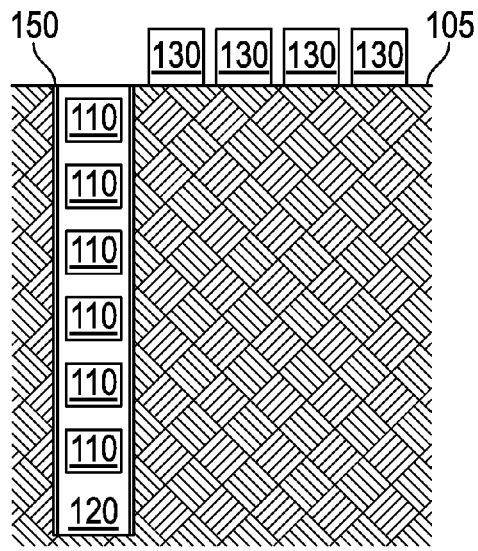
FIG. 2 is a schematic view of an example EM arrangement according to one or more aspects of the present disclosure.
Figure 3:
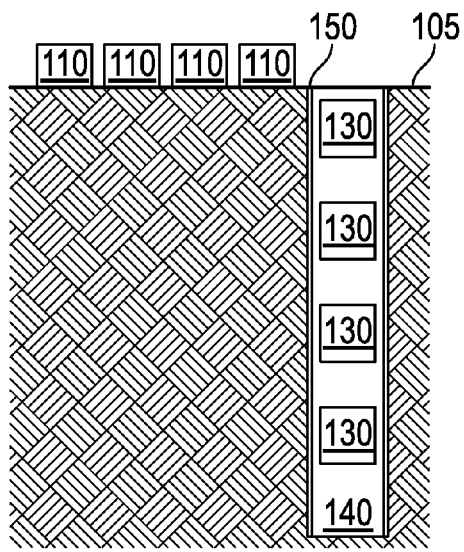
FIG. 3 is a schematic view of an example EM arrangement according to one or more aspects of the present disclosure.
Figure 4:
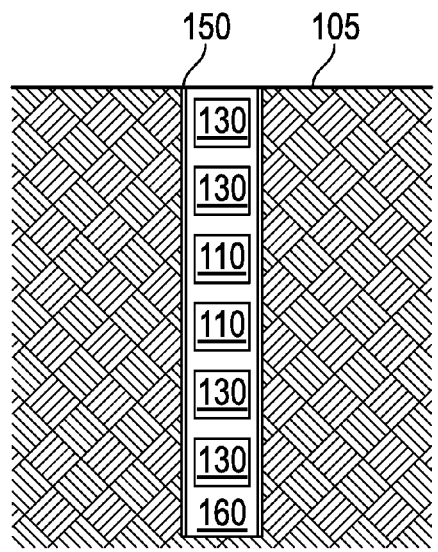
FIG. 4 is a schematic view of an example EM arrangement according to one or more aspects of the present disclosure.

Example field arrays are schematically shown in FIGS. 1-4, although other arrays are also within the scope of the present disclosure. FIG. 1 is an example borehole-to-borehole (BTB) or "cross-well" arrangement within the scope of the present disclosure, comprising EM transmitters 110 positioned in a first borehole 120 and EM receivers 130 positioned in a second borehole 140. One or both of the boreholes 120 and 140 may comprise a steel and/or otherwise electrically conductive casing 150. FIG. 2 is an example BTS arrangement that is substantially similar to the arrangement shown in FIG. 1 except that the EM receivers 130 are positioned at the Earth's surface 105. FIG. 3 is an example STB arrangement that is substantially similar to the arrangement shown in FIG. 1 except that the EM transmitters 110 are positioned at the surface 105. FIG. 4 is an example single-well arrangement that is substantially similar to the arrangement shown in FIG. 1 except the EM transmitters 110 and EM receivers 130 are positioned in a single well 160, which may also comprise a similar casing 150. Arrangements for subsea but otherwise similar to those shown in FIGS. 1-4 are also within the scope of the present disclosure.

The EM transmitters 110 may be grounded wire and/or magnetic dipole transmitters. For example, in the cross-well arrangement shown in FIG. 1, the BTS arrangement shown in FIG. 2, and/or the single-well arrangement shown in FIG. 4, the EM transmitters 110 may be or comprise magnetic dipole transmitters, and in the STB arrangement shown in FIG. 3, the EM transmitters 110 may be or comprise grounded wire transmitters. However, although one or more aspects of the present disclosure may be described in the context of STB, BTS, and surface applications, such aspects may also or alternatively be applicable or readily adapted for other survey configurations within the scope of the present disclosure.

The EM receivers 130 may each comprise one or more three-component electric and/or magnetic dipole detectors. Magnetic dipole receivers may have higher sensitivities to conductive structures, whereas the electric dipole receivers may be more sensitive to resistive structures. Thus, for example, electric dipole receivers may be utilized as sensors for hydrocarbon detection. However, the EM receivers 130 may collect both electric and magnetic fields.

Different EM fields may be modeled and/or measured for different configurations within the scope of the present disclosure. By combining these fields in different ratios according to one or more aspects of the present disclosure, the effects of the conductive casing 150, karsts, and overburden may be reduced and/or eliminated. For example, in a BTS configuration, radial ($E_r$) and azimuth ($E_\Phi$) electric fields may be modeled and/or measured, and ratios between the two fields ($E_r/E_\Phi$) may be utilized to minimize or otherwise reduce the effect of the steel casing. Similarly, for STB configurations, downhole vertical electric ($E_z$) and magnetic ($H_z$) fields may be modeled and/or measured, and the ratio of the two fields ($E_z/H_z$) may be utilized to minimize or otherwise reduce the effect of the steel casing. For surface EM surveys, the ratio of surface radial electric and azimuth magnetic fields ($E_r/H_\Phi$) at large distances from a radial electric transmitter 110 may be utilized to minimize or otherwise reduce the effect of karsts located in the vicinity of the transmitter. For STB and/or BTS surveys, vertical and azimuth electric fields ($E_z$ and $E_\Phi$) and vertical and azimuth magnetic fields ($H_z$ and $H_\Phi$) may be collected. The ratios $E_z/H_z$, $E_\Phi/H_z$, and $E_z/H_\Phi$ may be utilized to minimize or otherwise reduce the effect of karsts located in the vicinity of the transmitter. The vertical electric ($E_z$) and magnetic ($H_z$) fields may be surveyed in both STB and BTS configurations, and their ratio ($E_z/H_z$) may be utilized to minimize or otherwise reduce the effect of variability of the overburden electrical properties.

Figure 5:
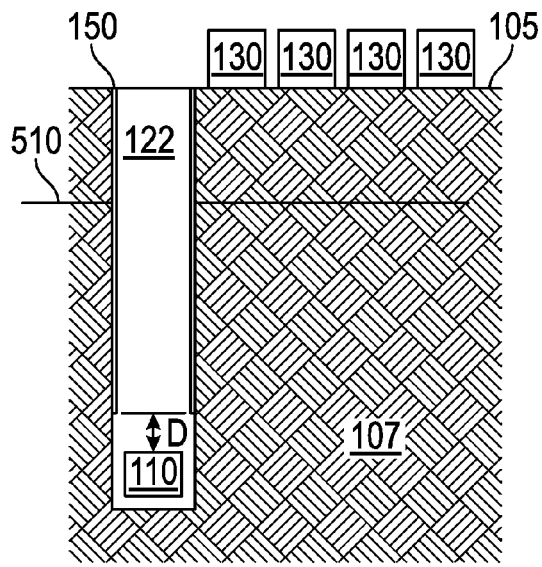
FIG. 5 is a schematic view of an example EM arrangement according to one or more aspects of the present disclosure.
Figure 6:
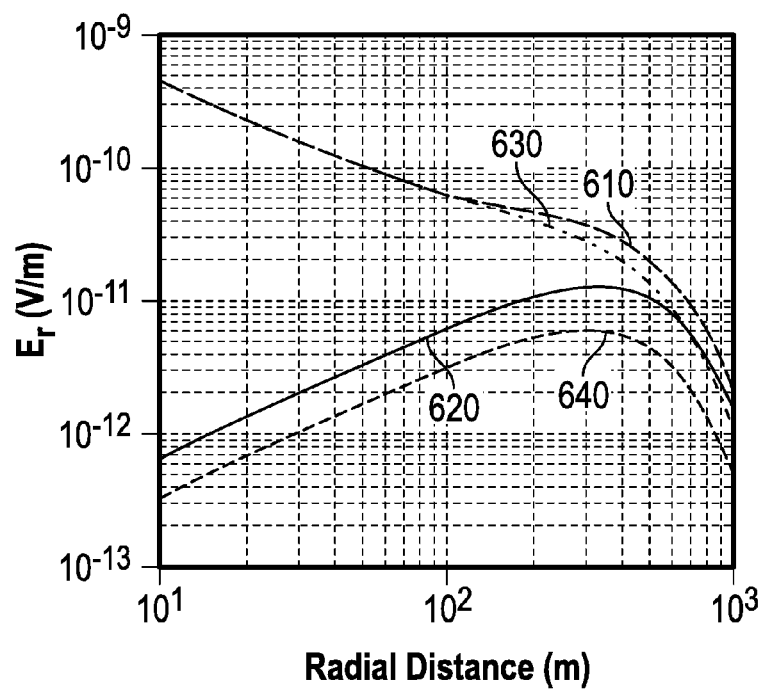
FIG. 6 is a graph demonstrating one or more aspects of the present disclosure.

FIG. 5 is an example BTS arrangement within the scope of the present disclosure in which a partially cased borehole 122 extends from the surface 105 through a subterranean region 107. The region 107 may comprise one or more subterranean formations, reservoirs, and/or other layers. A vertical electric dipole source and/or other transmitter 110 may be positioned in the borehole 120 below the end of the casing 150. For example, the transmitter may be vertically offset below the end of the casing 150 by a distance D, which may be about 10 m, although other vertical offset differences are also within the scope of the present disclosure. An applicable coordinate system may have an origin coinciding with the top of the casing 150 at the surface 105, such that the vertical axis increases (z>0) downwards. FIG. 6 depicts an example horizontal profile of the radial electric field component $E_r$ at a depth 510 (for example, z=1300 m) for the arrangement shown in FIG. 5. Curve 610 depicts an example effect of the resistive reservoir for a scenario that includes the casing 150. Curve 620 depicts an example effect of the resistive reservoir for a scenario that excludes the casing 150. Curve 630 depicts an example effect absent the resistive reservoir for a scenario that includes the casing 150. Curve 640 depicts an example effect absent the resistive reservoir for a scenario that excludes the casing 150.

As depicted in the example of FIG. 6, the casing 150 may distort the measured fields even at a substantial radial distance from the borehole 120. The radial electric field may increase as the observation position approaches the casing 150, and may remain stronger than the open-hole field, even at radial offsets greater than about 1 km. However, as the transmitter 110 departs from the casing 150, the amplitude of the effect may decrease and perhaps drop below the primary source field, which may dominate at some radial offset. Current leaking radially outwards from the casing 150 may explain the strong radial field observed near the casing 150. For example, current may channel vertically in the conductive casing 150, while a non-divergent condition of the current density ($\nabla \cdot J=0$) may cause it to decrease away from the casing 150, towards the conductive surroundings, thus providing a leakage path. In turn, the portion of the current flowing vertically along the casing 150 may induce an azimuthally symmetric secondary magnetic field.

Figure 7:
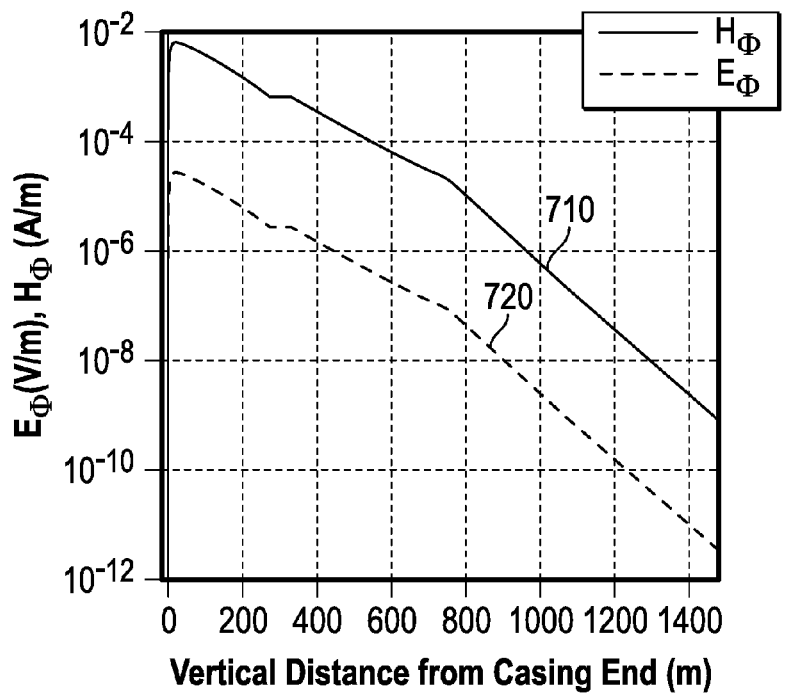
FIG. 7 is a graph demonstrating one or more aspects of the present disclosure.
Figure 8:
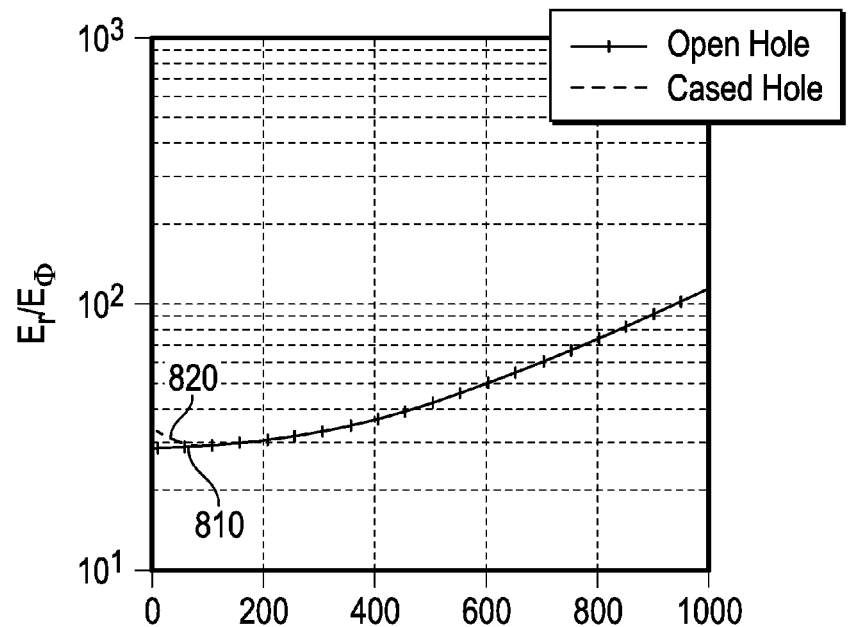
FIG. 8 is a graph demonstrating one or more aspects of the present disclosure.

FIG. 7 depicts an example azimuthal component of the magnetic field due to a vertical electric source (solid line) and an example azimuthal component of the electric field due to a vertical magnetic dipole moment source (dashed line), where the end of the casing 150 coincides with z=0. Curve 710 depicts the current flowing in the casing 150, while curve 720 depicts the flux of magnetic field, as a function of vertical distance from the end of the casing 150. The effect of the casing 150 may yield substantially or completely equivalent vertical flow of electric current and flux of magnetic field up and down the casing. Therefore, the response of the casing may also be equivalent in the surface measurements of $E_r$, due to a vertical electric downhole source, and $E_\Phi$, for the vertical magnetic downhole dipole moment. The ratio $E_r/E_\Phi$, measured as a function of radial distance from the casing 150, may have a minimum or otherwise reduced casing effect. For example, FIG. 8 depicts the ratio $E_r/E_\Phi$, with a hashed curve 810 for an example open-hole scenario and a solid curve 820 for an example cased-hole scenario. As shown in FIG. 8, the overlap of the curves 810 and 820 may indicate that this ratio $E_r/E_\Phi$, is less sensitive and/or substantially or completely insensitive to the casing 150.

Reciprocity may indicate that the implementation depicted in FIG. 5 may be equivalent to that of the STB method. For example, one or more sources at the surface 105 may be or comprise one or more radial surface antennas ($J_r$), which may give rise to a vertical electric field downhole ($E_z$), and/or one or more azimuthal surface antennas ($J_\Phi$), which may yield a vertical magnetic field downhole ($H_z$). Thus, the ratio $E_z/H_z$ may be utilized to minimize or otherwise reduce the casing effect.

Figure 9:
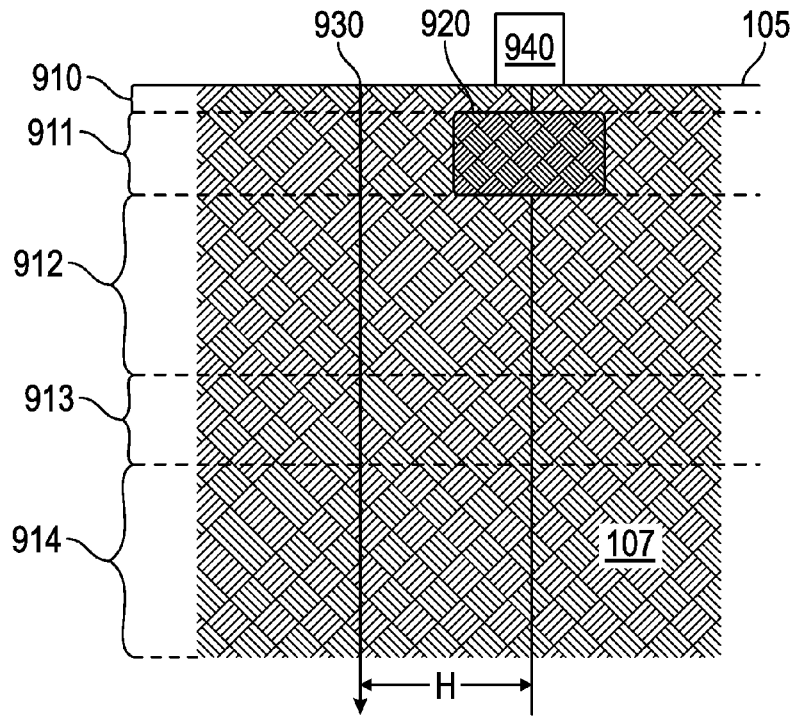
FIG. 9 is a schematic view of an example EM arrangement according to one or more aspects of the present disclosure.

FIG. 9 is an example surface and/or STB arrangement demonstrating one or more aspects of the present disclosure. The formation 107 in FIG. 9 includes five zones 910-914 of varying depth and resistivity. For example, zone 910 may extend downward about 10 m from the surface 105, and may have a resistivity of about 50 Ωm. Zone 911 may extend downward about 100 m from zone 910, and may have a resistivity of about 200 Ωm. Zone 912 may extend downward about 1,800 m from zone 911, and may have a resistivity of about 10 Ωm. Zone 913 may extend downward about 100 m from zone 912, and may have a resistivity of about 30 Ωm. Zone 914 may extend downward about 1800 m from zone 913, and may have a resistivity of about 50 Ωm. Of course, arrangements in which fewer or greater zones exist, including at other depths and/or resistivities, are also within the scope of the disclosure.

One or more of the subterranean zones may comprise one or more karsts, such as the example karst 920 depicted in zone 911. The karst 920 may have a resistivity of about 10 Ωm, although this is merely an example, as other karsts may have a different resistivity. Moreover, while the karst 920 is depicted as vertically spanning the zone 911, other karsts may not vertically span the entire depth of a zone, and/or may traverse more than one zone. The arrangement also comprises one or more sources (such as the sources 110 described above), which may positioned be at the surface 105 or downhole, and are therefore simply depicted in FIG. 9 by arrow 930. A surface station comprising one or more sources and/or receivers (such as the sources 110 and/or the receivers 130 described above) may also exist, such as the example station 940 depicted in FIG. 9. The example surface station 940 is depicted as directly overlying the karst 920, although other arrangements are also within the scope of the present disclosure. The horizontal distance H separating the surface station 940 from the source(s) 930 may be about 1 km, although other distances are also within the scope of the present disclosure.

Figure 10:
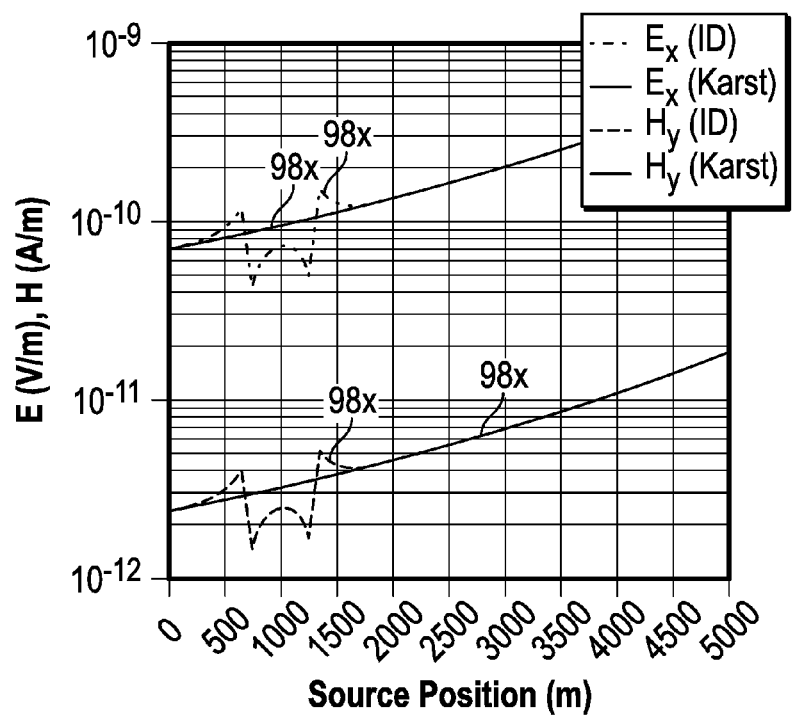
FIG. 10 is a graph demonstrating one or more aspects of the present disclosure.
Figure 11:
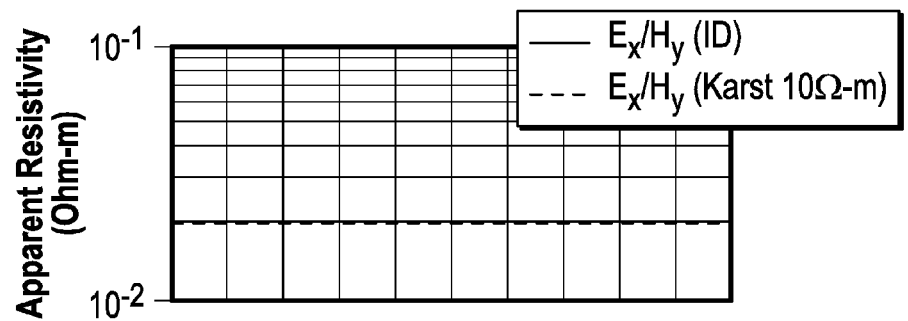
FIG. 11 is a graph demonstrating one or more aspects of the present disclosure.

Numerical, two-dimensional simulations of the electric and/or magnetic fields observed at the distant surface station 940 may show that the presence of the karst 920 may distort the fields as the source traverses the surface 105 above the karst 920, as depicted in the example shown in FIG. 10. For example, karsts in the shallow subsurface (e.g., in zones 910 and 911) may yield channeling of the current density, which may be described as an accumulation of charges at the boundaries of the karsts, which may yield secondary sources at the position of the karsts. In turn, the secondary sources may bias the electric and/or magnetic fields recorded away from the primary source 930, both on the surface 105 and downhole. However, as depicted in FIG. 11, the ratio between orthogonal electric and magnetic fields (e.g., $E_x/H_y$ in FIG. 11), as measured at the distant surface station 940, may be insensitive to the karsts.

The same behavior of the ratio may be observed for the downhole measurement of the vertical component of the fields (e.g., $E_z/H_z$) as a function of the source surface position. In this case, the vertical electric field component $E_z$ may be due to a surface radial electric antenna, while the vertical magnetic field component $H_z$ may be due to a surface azimuthal electric antenna.

Figure 12:
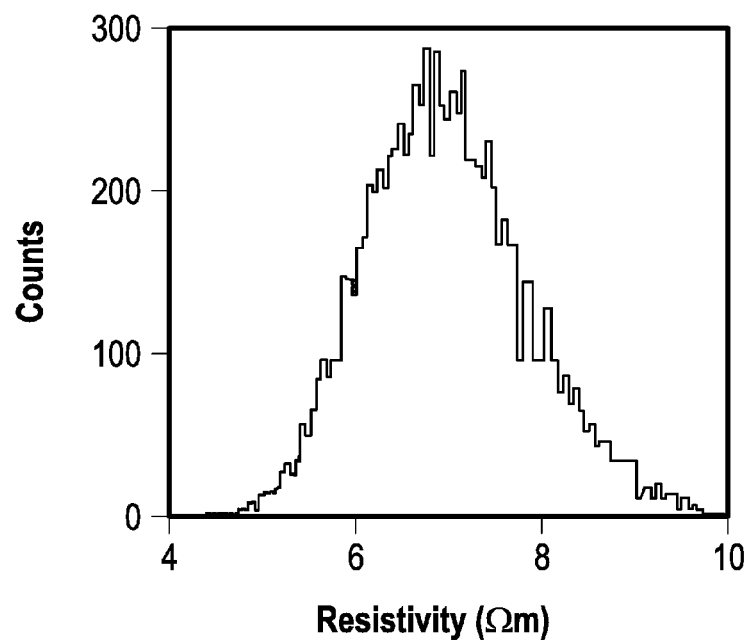
FIG. 12 is a graph demonstrating one or more aspects of the present disclosure.
Figure 13:
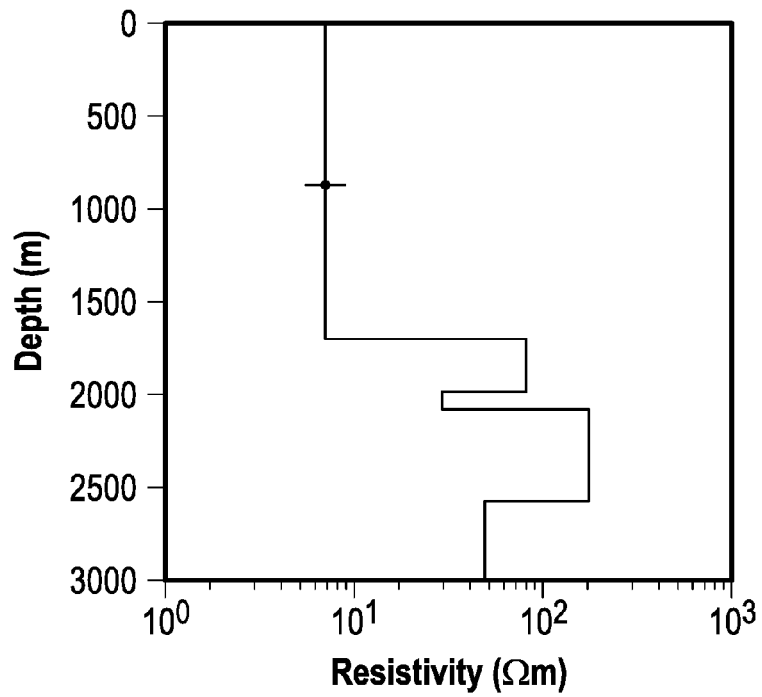
FIG. 13 is a graph demonstrating one or more aspects of the present disclosure.
Figure 14:
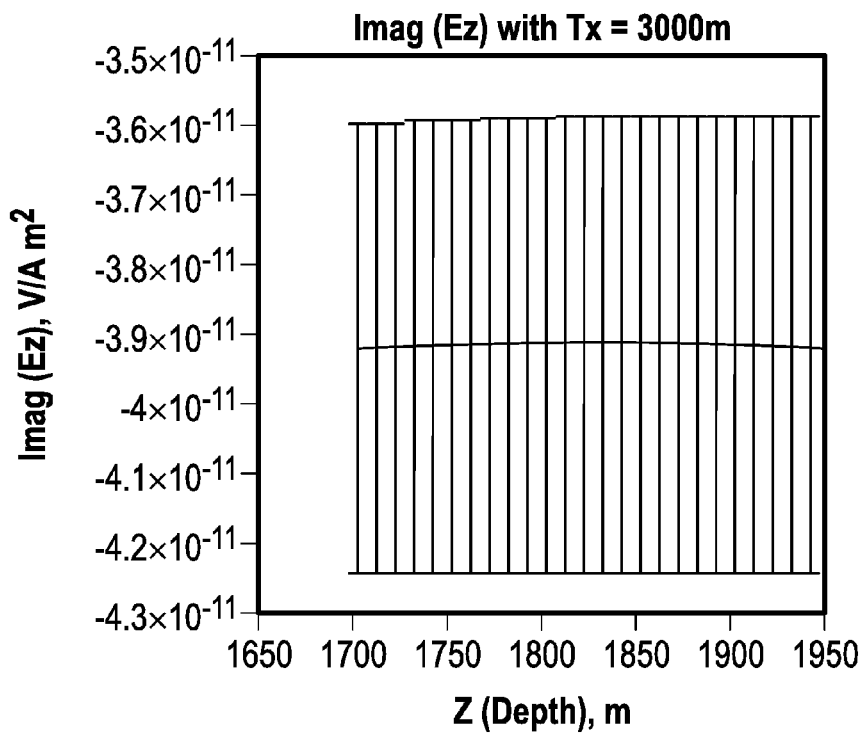
FIG. 14 is a graph demonstrating one or more aspects of the present disclosure.
Figure 15:
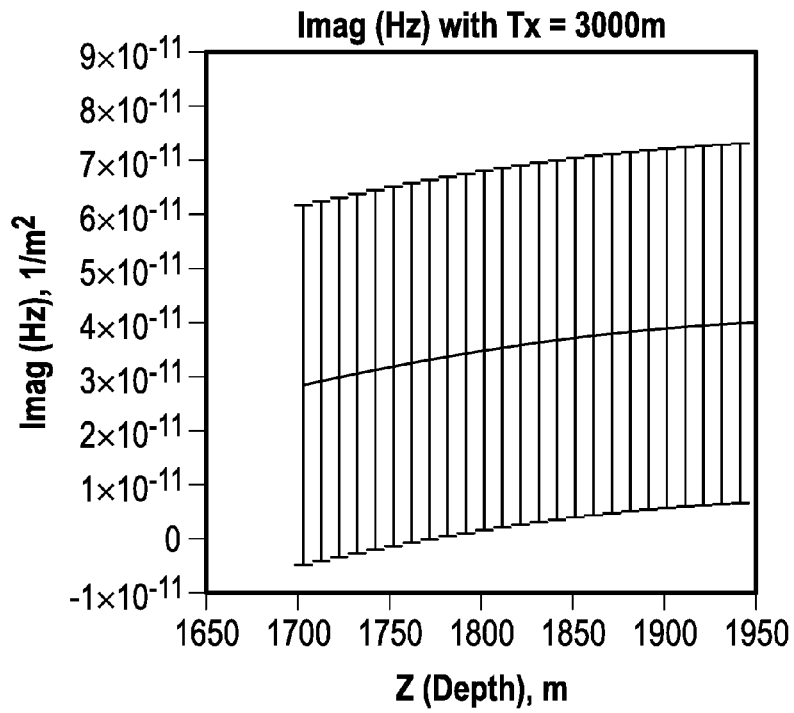
FIG. 15 is a graph demonstrating one or more aspects of the present disclosure.
Figure 16:
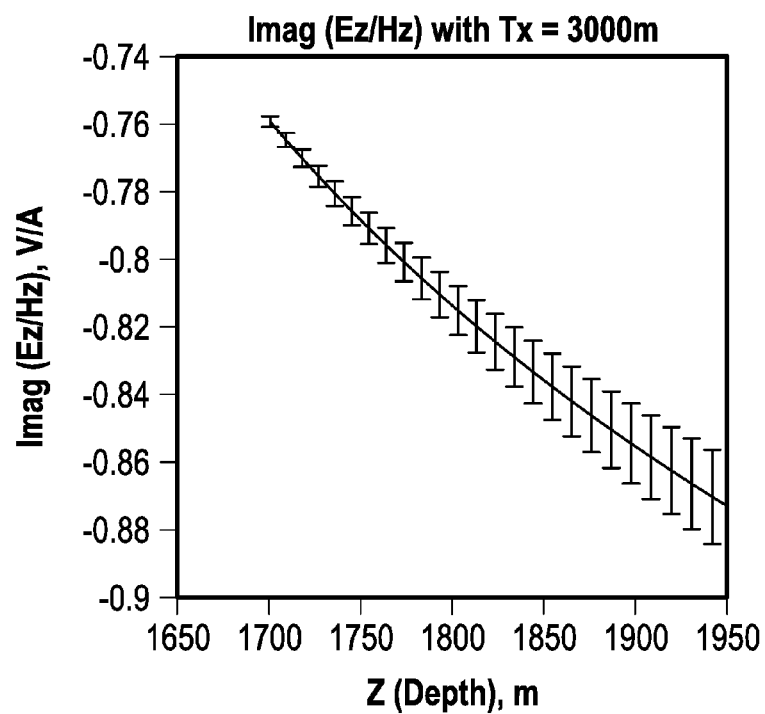
FIG. 16 is a graph demonstrating one or more aspects of the present disclosure.

As demonstrated in FIG. 12, a normal distribution may be utilized to describe the uncertainty of the overburden resistivity and/or conductivity. FIG. 13 demonstrates an example for layered overburden. The structure uncertainty may also be represented as error bars on the measured downhole electric and magnetic fields, as demonstrated in FIGS. 14 and 15. The error bars may be attributable to, for example, uncertainty of the overburden resistivity. Larger error bars may mask anomalous fields due to hydrocarbon reservoir at depth. Thus, when utilizing STB methods to detect reservoirs, the error bars may be reduced. For the ratio between the vertical components of the electric and magnetic fields ($E_z/H_z$), for example, the error bars may be reduced as depicted in FIG. 16.

Figure 17:
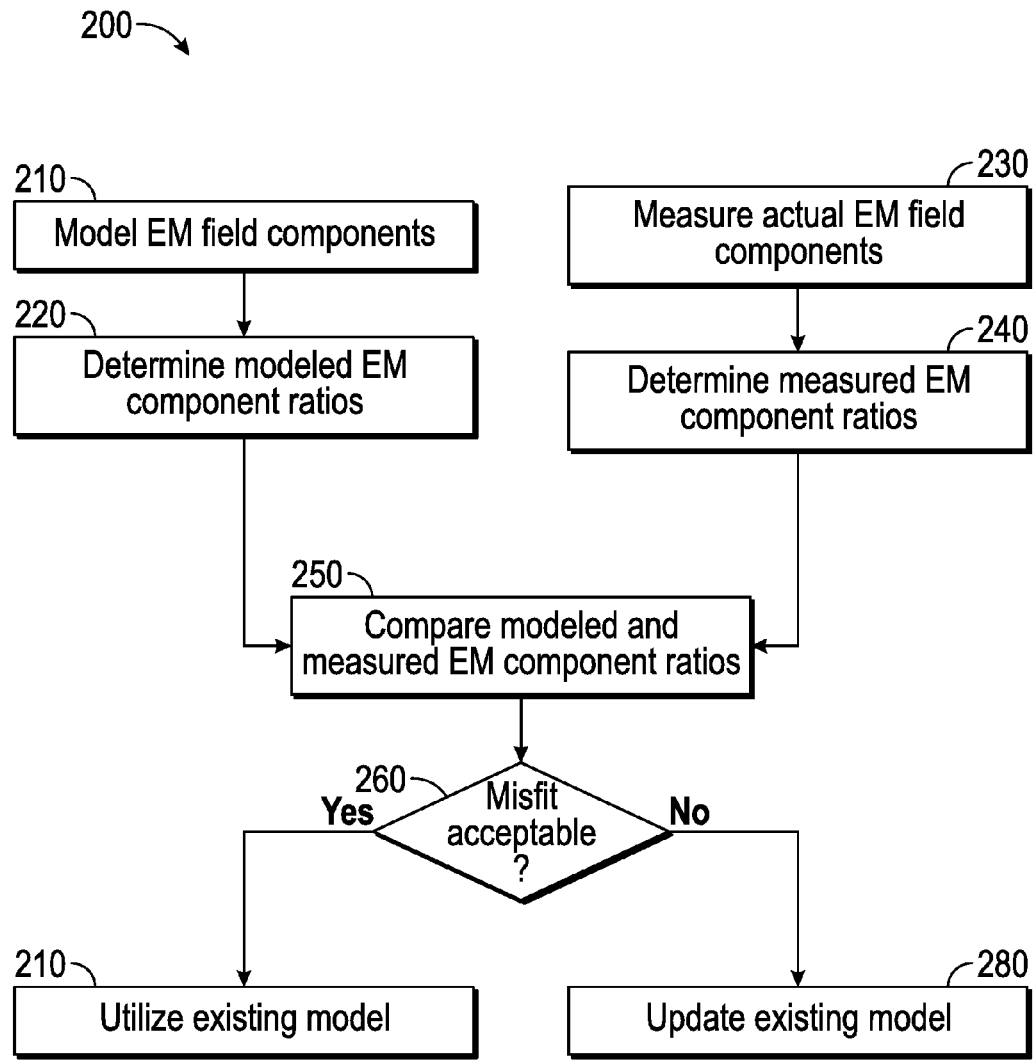
FIG. 17 is a flow-chart diagram of at least a portion of a method according to one or more aspects of the present disclosure.

FIG. 17 is a flow-chart diagram of at least a portion of a method (200) according to one or more aspects of the present disclosure. The method (200) comprises operating an electronic device to model (210) expected EM field components to be measured by an EM apparatus associated with a subterranean formation. The electronic device may be as described below. The method (200) also comprises operating the electronic device to determine (220) one or more ratios of the modeled EM field components.

The EM apparatus may comprise at least one EM source and at least one EM receiver, such as those described above. The method (200) also comprises operating the at least one EM source to emit an EM signal into the subterranean formation, and operating the at least one EM receiver to measure (230) actual EM field components of the EM signal.

The electronic device may then be operated to compare (250) the one or more ratios of the modeled EM field components with one or more ratios of the actual EM field components. The electronic device may then determine (260) whether any misfit between the modeled and actual EM field component ratios is within an acceptable range. If the misfit is acceptable, then the existing model may be utilized (270) for subsequent processing. If the misfit is not acceptable, then the existing model may be updated (280) based on the actual EM field components and/or ratios thereof.

There are various different implementations of such method (200) within the scope of the present disclosure. For example, the at least one EM source may be positioned in a borehole extending into the subterranean formation, and the at least one EM receiver may be positioned at the Earth's surface, such as with the BTS arrangements described above. In such implementation, the one or more ratios of the modeled EM field components may comprise a ratio of a modeled radial electric field component to a modeled azimuthal electric field component, and the one or more ratios of the actual EM field components may comprise a ratio of an actual radial electric field component to an actual azimuthal electric field component. As described above, for BTS arrangements, the ratios of modeled and actual radial and azimuthal electric field components may be less affected, relative to the modeled and actual radial and azimuthal electric field components alone, by the modeled and actual existence of a conductive casing lining at least a portion of the borehole. For example, distortion of the modeled and actual radial and azimuthal electric field components attributable to the conductive casing lining may be about 80%, while such distortion may be reduced to about 10% for the ratios. Of course, other distortion values and/or their reduction amounts are also within the scope of the present disclosure.

In another example BTS implementation, the one or more ratios of the modeled EM field components may comprise a ratio of a modeled vertical electric field component to a modeled vertical magnetic field component, and the one or more ratios of the actual EM field components may comprise a ratio of an actual vertical electric field component to an actual vertical magnetic field component. As described above, for BTS arrangements, the ratios of modeled and actual vertical electric and vertical magnetic field components may be less affected, relative to the modeled and actual vertical electric and vertical magnetic field components alone, by the modeled and actual existence of one or more karsts located in a signal path between the EM source and receiver. For example, distortion of the modeled and actual vertical electric and vertical magnetic field components attributable to the karsts may be about 80%, while such distortion may be reduced to about 10% for the ratios. Of course, other distortion values and/or their reduction amounts are also within the scope of the present disclosure.

In another example BTS implementation, the one or more ratios of the modeled EM field components may comprise a ratio of a modeled azimuthal electric field component to a modeled vertical magnetic field component, and the one or more ratios of the actual EM field components may comprise a ratio of an actual azimuthal electric field component to an actual vertical magnetic field component. As described above, for BTS arrangements, the ratios of modeled and actual azimuthal electric and vertical magnetic field components may be less affected, relative to the modeled and actual azimuthal electric and vertical magnetic field components alone, by the modeled and actual existence of one or more karsts located in a signal path between the at least one EM source and the at least one EM receiver. For example, distortion of the modeled and actual azimuthal electric and vertical magnetic field components attributable to the karsts may be about 80%, while such distortion may be reduced to about 10% for the ratios. Of course, other distortion values and/or their reduction amounts are also within the scope of the present disclosure.

In another example BTS implementation, the one or more ratios of the modeled EM field components may comprise a ratio of a modeled vertical electric field component to a modeled azimuthal magnetic field component, and the one or more ratios of the actual EM field components may comprise a ratio of an actual vertical electric field component to an actual azimuthal magnetic field component. As described above, for BTS implementations, the ratios of modeled and actual vertical electric and azimuthal magnetic field components may be less affected, relative to the modeled and actual vertical electric and azimuthal magnetic field components alone, by the modeled and actual existence of one or more karsts located in a signal path between the at least one EM source and the at least one EM receiver. For example, distortion of the modeled and actual vertical electric and azimuthal magnetic field components attributable to the karsts may be about 80%, while such distortion may be reduced to about 10% for the ratios. Of course, other distortion values and/or their reduction amounts are also within the scope of the present disclosure.

In a similar implementation, the at least one EM source may be positioned at the Earth's surface, and the at least one EM receiver may be positioned in a borehole extending into the subterranean formation, such as the STB arrangements described above. In such implementation, the one or more ratios of the modeled EM field components may comprise a ratio of a modeled vertical electric field component to a modeled vertical magnetic field component, and the one or more ratios of the actual EM field components may comprise a ratio of an actual vertical electric field component to an actual vertical magnetic field component. As described above, for STB implementations, the ratios of modeled and actual vertical electric and magnetic field components may be less affected, relative to the modeled and actual vertical electric and magnetic field components alone, by the modeled and actual existence of a conductive casing lining at least a portion of the borehole. For example, distortion of the modeled and actual vertical electric and magnetic field components attributable to the conductive casing lining may be about 80%, while such distortion may be reduced to about 10% for the ratios. Of course, other distortion values and/or their reduction amounts are also within the scope of the present disclosure.

In another STB implementation, the one or more ratios of the modeled EM field components may comprise a ratio of a modeled azimuthal electric field component to a modeled vertical magnetic field component, and the one or more ratios of the actual EM field components may comprise a ratio of an actual azimuthal electric field component to an actual vertical magnetic field component. As described above, for STB implementations, the ratios of modeled and actual azimuthal electric and vertical magnetic field components may be less affected, relative to the modeled and actual azimuthal electric and vertical magnetic field components alone, by the modeled and actual existence of one or more karsts located in a signal path between the at least one EM source and the at least one EM receiver. For example, distortion of the modeled and actual azimuthal electric and vertical magnetic field components attributable to the karsts may be about 80%, while such distortion may be reduced to about 10% for the ratios. Of course, other distortion values and/or their reduction amounts are also within the scope of the present disclosure.

In another STB implementation, the one or more ratios of the modeled EM field components may comprise a ratio of a modeled vertical electric field component to a modeled azimuthal magnetic field component, and the one or more ratios of the actual EM field components may comprise a ratio of an actual vertical electric field component to an actual azimuthal magnetic field component. As described above, for STB implementations, the ratios of modeled and actual vertical electric and azimuthal magnetic field components may be less affected, relative to the modeled and actual vertical electric and azimuthal magnetic field components alone, by the modeled and actual existence of one or more karsts located in a signal path between the at least one EM source and the at least one EM receiver. For example, distortion of the modeled and actual vertical electric and azimuthal magnetic field components attributable to the karsts may be about 80%, while such distortion may be reduced to about 10% for the ratios. Of course, other distortion values and/or their reduction amounts are also within the scope of the present disclosure.

In a similar implementation, the at least one EM source and the at least one EM receiver may both be positioned at the Earth's surface. In such implementation, the one or more ratios of the modeled EM field components may comprise a ratio of a modeled radial electric field component to a modeled azimuthal magnetic field component, and the one or more ratios of the actual EM field components may comprise a ratio of an actual radial electric field component to an actual azimuthal magnetic field component. As described above, for surface-to-surface implementations, the ratios of modeled and actual radial electric and azimuthal magnetic field components may be less affected, relative to the modeled and actual radial electric and azimuthal magnetic field components alone, by the modeled and actual existence of one or more karsts located in a signal path between the at least one EM source and the at least one EM receiver. For example, distortion of the modeled and actual radial electric and azimuthal magnetic field components attributable to the karsts may be about 80%, while such distortion may be reduced to about 10% for the ratios. Of course, other distortion values and/or their reduction amounts are also within the scope of the present disclosure.

Figure 18:
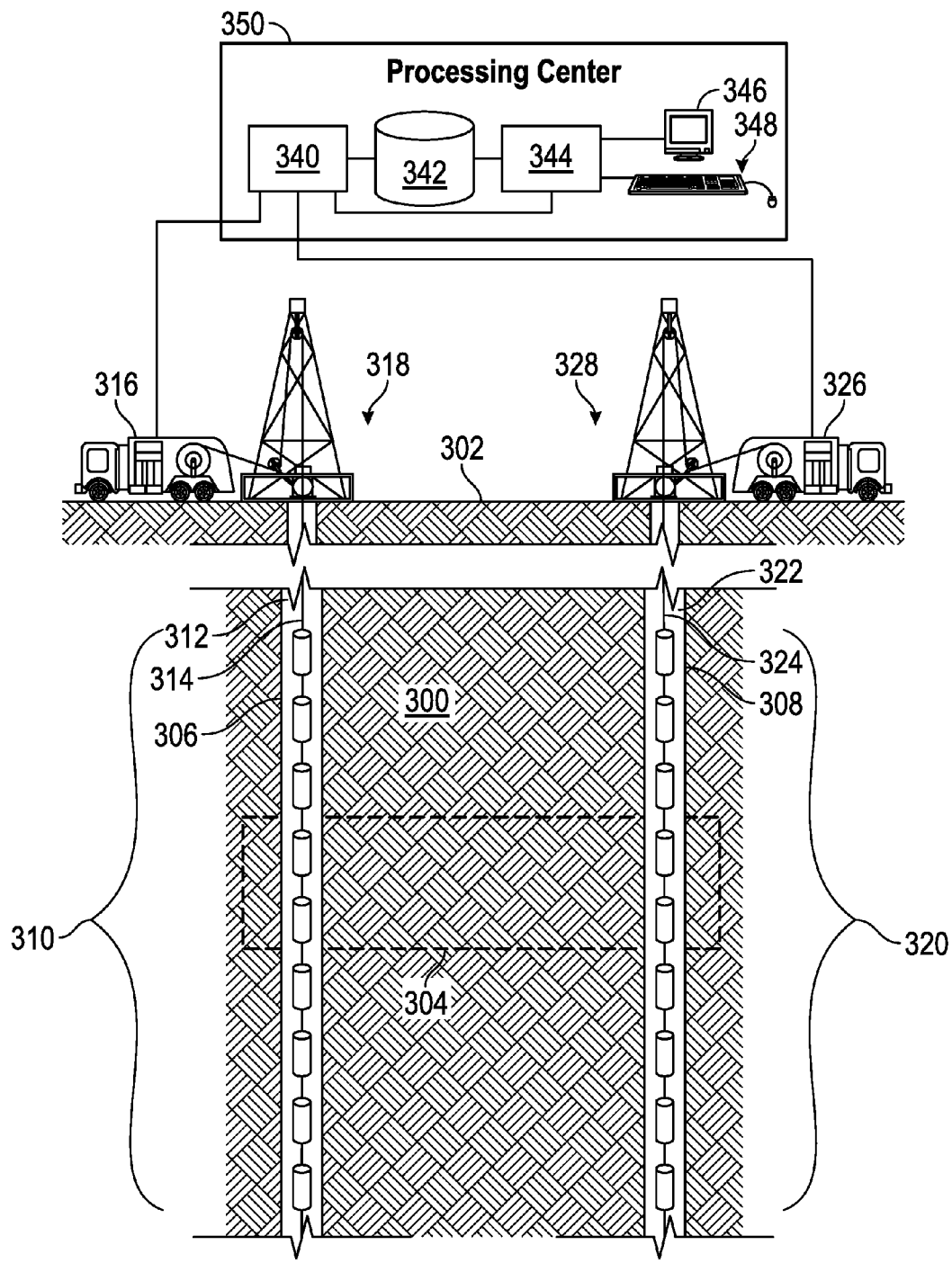
FIG. 18 is a schematic view of at least a portion of apparatus according to one or more aspects of the present disclosure.
Figure 19:
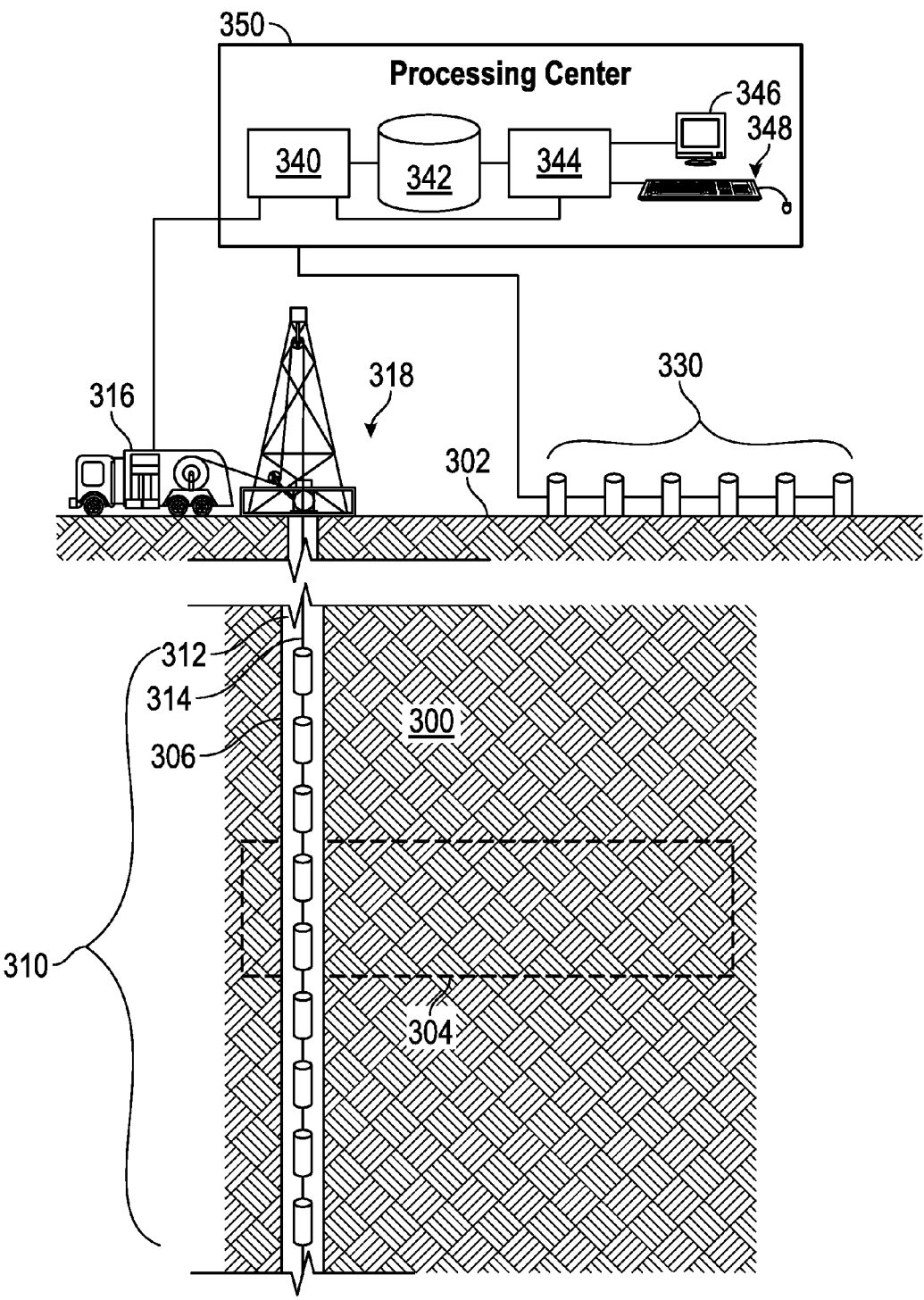
FIG. 19 is a schematic view of at least a portion of apparatus according to one or more aspects of the present disclosure.
Figure 20:
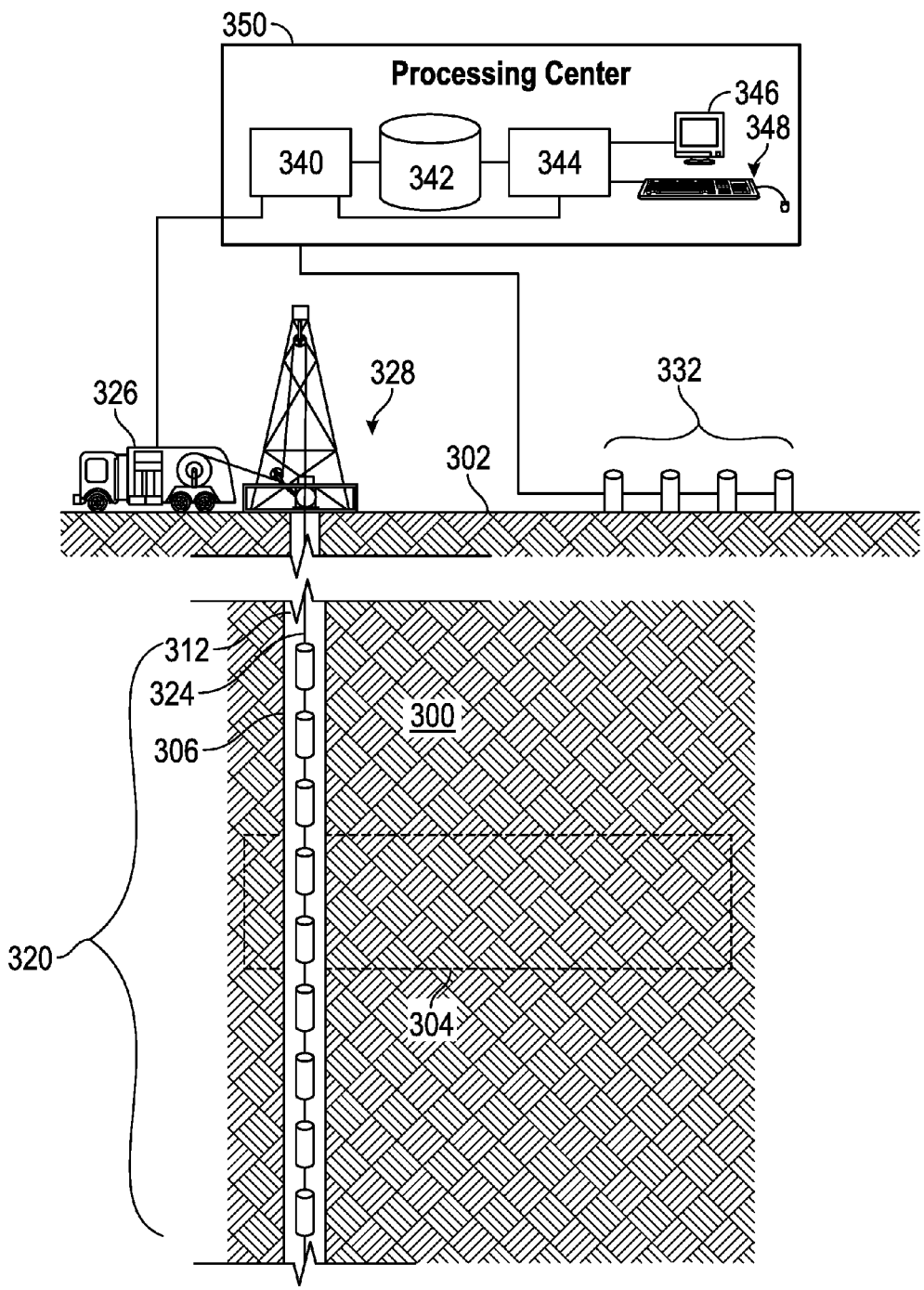
FIG. 20 is a schematic view of at least a portion of apparatus according to one or more aspects of the present disclosure.
Figure 21:
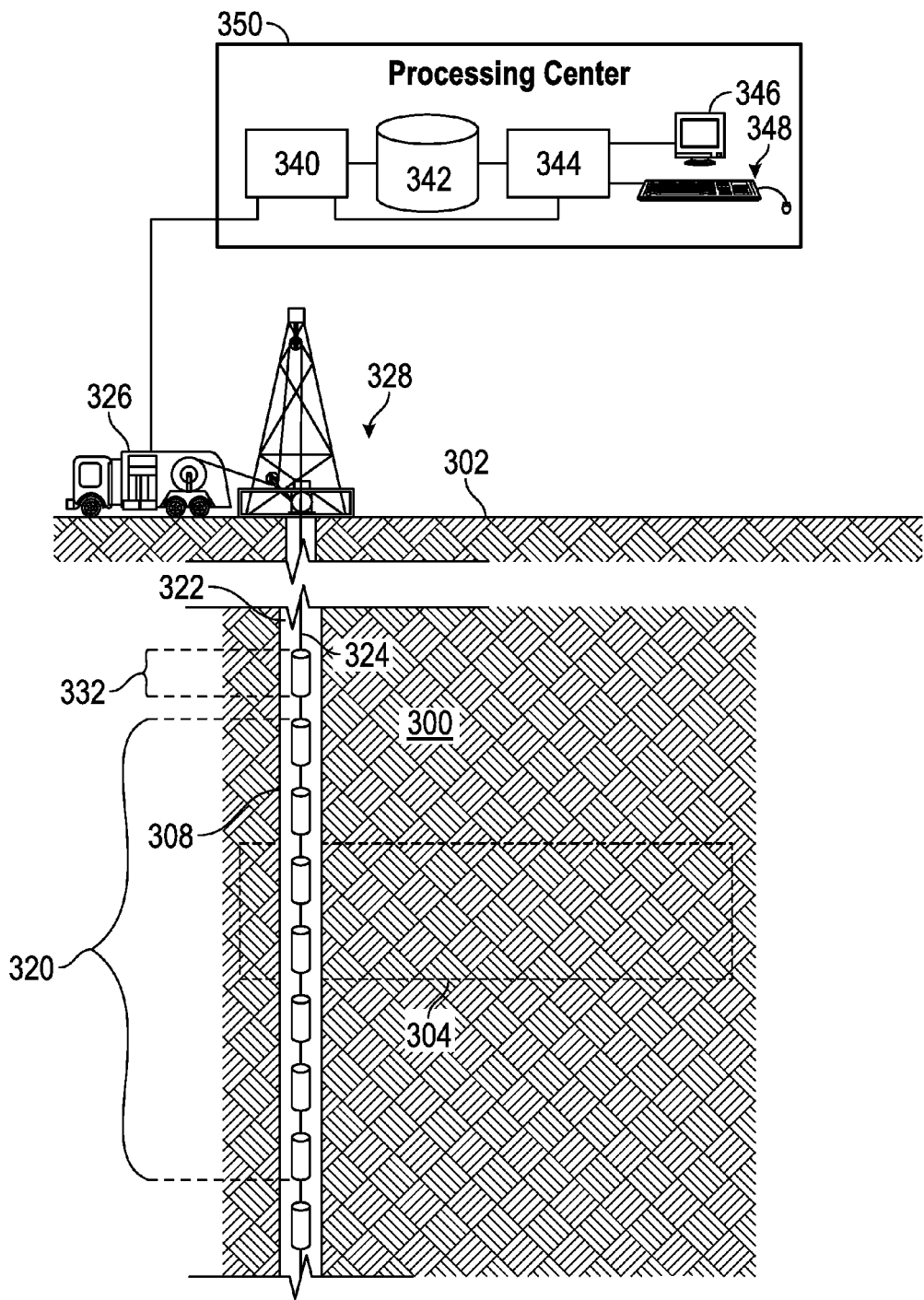
FIG. 21 is a schematic view of at least a portion of apparatus according to one or more aspects of the present disclosure.

FIGS. 18-21 are schematic drawings illustrating different source-receiver array arrangements according to one or more aspects of the present disclosure, and similar to one or more of the arrangements described above. FIG. 18 depicts a BTB or cross-well arrangement, as described above, in which an array of EM sources 310 are deployed in a borehole 312 having a casing 306, and an array of EM field receivers 320 are deployed in a borehole 322 having a conductive casing 308. The sources 310 may be deployed via a wireline 314 extending from a wireline truck 316 at the wellsite 318 on the Earth's surface 302. Similarly, the receivers 320 may be deployed via a wireline 324 from a wireline truck 326 at the wellsite 328. FIG. 19 depicts a BTS arrangement, as described above, in which EM sources 310 are deployed in a borehole 312 having a conductive casing 308, and an array of EM field receivers 330 are deployed on the Earth's surface 302. FIG. 20 depicts an STB arrangement, as described above, in which EM field receivers 320 are deployed in a borehole 322 having a conductive casing 308, and an array of EM sources 332 are deployed on the Earth's surface 302. FIG. 21 depicts a single well configuration, as described above, in which EM field receivers 320 and an EM source 332 are deployed in a borehole 322 having a conductive casing 308.

FIGS. 18-21 also depict a processing center 350 which may comprise one or more central processing units (CPUs) 344 that may be operable to perform at least a portion of the EM processing described herein, as well as other processing. The processing center 350 may also comprise one or more storage systems 342, one or more communications and/or input/output modules 340, one or more user displays 346, and one or more user input systems 348. The processing center 350 may be included in one or both of the logging trucks 316 and 326. The processing center 350 may also or alternatively be located in a location remote from the wellsites 318 and 328.

Although the surface 302 is depicted in FIGS. 18-21 as being a land surface, the region above the surface 302 may be water, as in the case of marine implementations. For example, for the BTS and STB cases depicted in FIGS. 19 and 20, respectively, the surface 302 may be the sea floor, and the receivers 332 and sources 330 may be deployed from a vessel.

The boreholes 312 and 322 are formed within a subterranean formation 300, and at least one of the boreholes involved in the survey may be cased with a conductive material, such as steel or chromium-alloyed steel. For a controlled-source EM survey, the sources 310 and 332 may be polarized electric and/or magnetic dipole sources, as described above. The surface sources 332 may be deep-towed or stationary sources. The sources 310 and 332 may be utilized to excite band-limited, low frequency (e.g., ranging between about 0.01 kHz and about 3 kHz) EM signals. These signals may propagate through the subsurface and become perturbed by geologic variation to depths of several kilometers. The receivers 320 and 330 may be spatially distributed, multi-component, broadband receivers operable to record the EM energy. The transmitted and recorded signals may be electric fields, magnetic fields, or a combination thereof.

The EM survey may be utilized to non-intrusively provide an image of formation resistivity and/or conductivity, including the location of high resistivity zones such as hydrocarbon bearing reservoirs, gas injection zones, and fresh-water aquifers, as well as high conductivity zones such as produced by the presence of saline water, mineralized zones, shale, and clay. These images may be utilized in the characterization of hydrocarbon reservoirs and ground-water aquifers, for locating bypassed oil deposits, for monitoring reservoir production, groundwater, steam, and gas injection processes, and for imaging saltwater intrusion into aquifers, among other examples within the scope of the present disclosure.

The attenuation induced by the conductive casing(s), karsts, and/or overburden may be reduced or eliminated according to one or more aspects of the present disclosure. Thus, the formation signal alone may be made available for subsequent inversion and/or other EM processing within the scope of the present disclosure.

Figure 22:
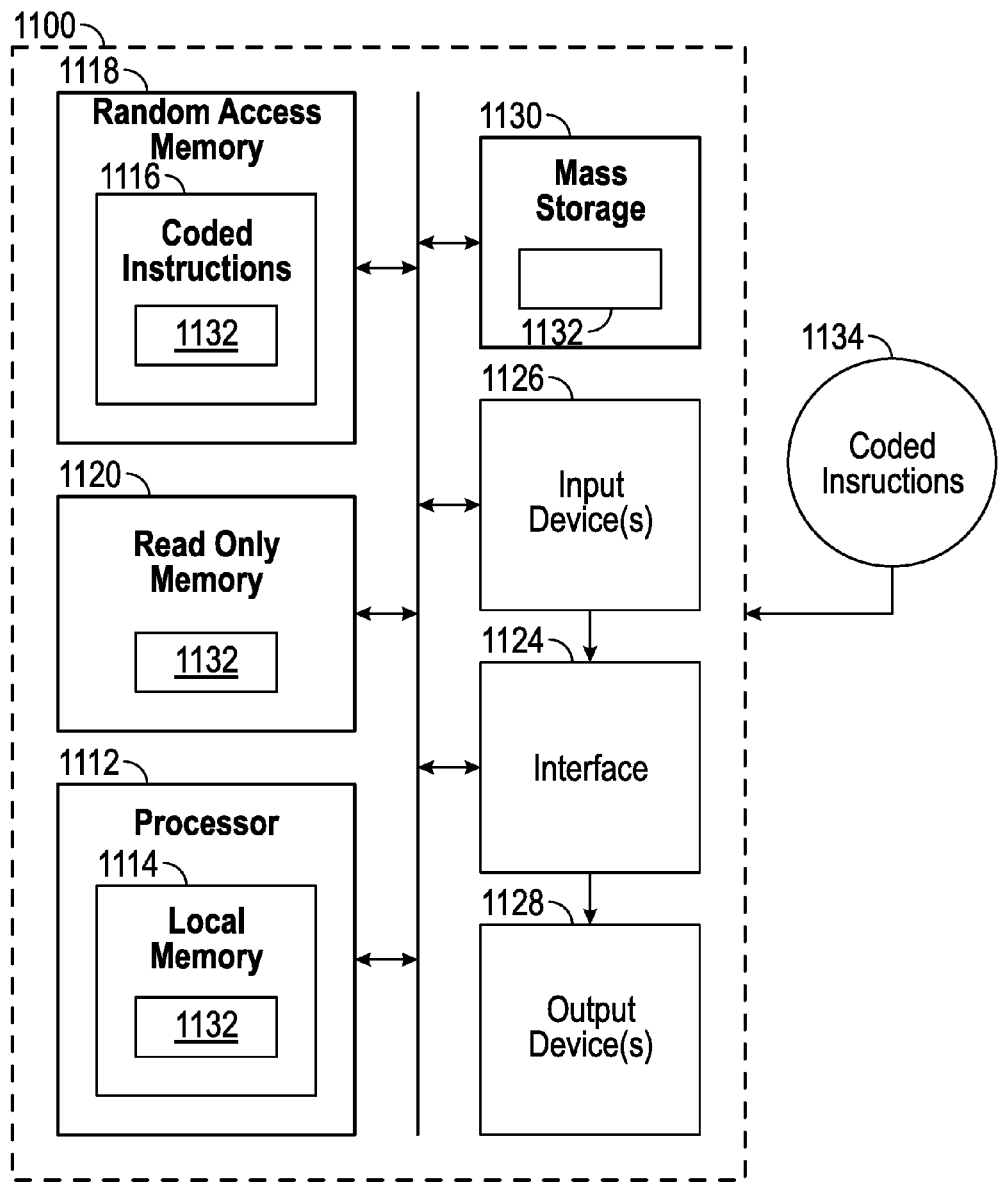
FIG. 22 is a schematic view of at least a portion of apparatus according to one or more aspects of the present disclosure.

FIG. 22 is a block diagram of an example processing system 1100 that may execute example machine-readable instructions to implement one or more aspects of the methods and/or processes described herein, and/or to implement one or more aspects of the example EM processing described herein. The processing system 1100 may be at least partially implemented in one or more of the EM apparatus and/or surface equipment shown in the preceding figures and/or described above. The processing system 1100 may be or comprise, for example, one or more processors, controllers, special-purpose computing devices, servers, personal computers, personal digital assistant (PDA) devices, smartphones, internet appliances, and/or any other type(s) of electronic device(s).

The system 1100 comprises a processor 1112 such as, for example, a general-purpose programmable processor. The processor 1112 includes a local memory 1114, and executes coded instructions 1132 present in the local memory 1114 and/or in another memory device. The processor 1112 may execute, among other things, machine-readable instructions to implement the methods and/or processes described herein. The processor 1112 may be, comprise, or be implemented by any type of processing unit, such as one or more INTEL microprocessors, one or more microcontrollers from the ARM and/or PICO families of microcontrollers, one or more embedded soft/hard processors in one or more FPGAs, etc. Of course, other processors from other families are also appropriate.

The processor 1112 is in communication with a main memory including a volatile (e.g., random access) memory 1118 and a non-volatile (e.g., read-only) memory 1120 via a bus 1122. The volatile memory 1118 may be, comprise, or be implemented by static random access memory (SRAM), synchronous dynamic random access memory (SDRAM), dynamic random access memory (DRAM), RAMBUS dynamic random access memory (RDRAM), and/or any other type of random access memory device. The non-volatile memory 1120 may be, comprise, or be implemented by flash memory and/or any other desired type of memory device. One or more memory controllers (not shown) may control access to the main memory 1118 and/or 1120.

The processing system 1100 also includes an interface circuit 1124. The interface circuit 1124 may be, comprise, or be implemented by any type of interface standard, such as an Ethernet interface, a universal serial bus (USB), and/or a third generation input/output (3GIO) interface, among others.

One or more input devices 1126 are connected to the interface circuit 1124. The input device(s) 1126 permit a user to enter data and commands into the processor 1112. The input device(s) may be, comprise, or be implemented by, for example, a keyboard, a mouse, a touchscreen, a track-pad, a trackball, an isopoint, and/or a voice recognition system, among others.

One or more output devices 1128 are also connected to the interface circuit 1124. The output devices 1128 may be, comprise, or be implemented by, for example, display devices (e.g., a liquid crystal display or cathode ray tube display (CRT), among others), printers, and/or speakers, among others. The interface circuit 1124 may also comprise a graphics driver card.

The interface circuit 1124 also comprises a communication device, such as a modem or network interface card, to facilitate exchange of data with external computers via a network (e.g., Ethernet connection, digital subscriber line (DSL), telephone line, coaxial cable, cellular telephone system, satellite, etc.).

The processing system 1100 also comprises one or more mass storage devices 1130 operable to store machine-readable instructions and data. Examples of such mass storage devices 1130 include floppy disk drives, hard drive disks, compact disk drives, and digital versatile disk (DVD) drives, among others.

The coded instructions 1132 may be stored in the mass storage device 1130, the volatile memory 1118, the non-volatile memory 1120, the local memory 1114, and/or on a removable storage medium, such as a CD or DVD 1134.

As an alternative to implementing the methods and/or apparatus described herein in a system such as the processing system of FIG. 22, and/or in addition thereto, one or more aspects of the methods and or apparatus described herein may be embedded in a structure such as a processor and/or an ASIC (application specific integrated circuit).

One of more aspects described herein may be incorporated as methods, and/or in methods, that might be implemented in software and/or other computer program products, perhaps as part of data analysis and inversion algorithms of STB/BTS systems. Such methods may include those explicitly described herein, as well as other methods, software, analyses, inversions, and/or algorithms not explicitly described herein.

In view of the above, as well as FIGS. 1-22, it will be readily apparent to a person having ordinary skill in the art that the present disclosure introduces a method comprising: operating an electronic device to model expected electromagnetic (EM) field components to be measured by an EM apparatus associated with a subterranean formation, wherein the EM apparatus comprises at least one EM source and at least one EM receiver; operating the electronic device to determine one or more ratios of the modeled EM field components; operating the at least one EM source to emit an EM signal into the subterranean formation, and operating the at least one EM receiver to measure actual EM field components of the EM signal; operating the electronic device to compare the one or more ratios of the modeled EM field components with one or more ratios of the actual EM field components; and updating the one or more ratios of the modeled EM field components based on the comparison.

In some implementations, the at least one EM source may be positioned in a borehole extending into the subterranean formation, and the at least one EM receiver may be positioned at the Earth's surface. The one or more ratios of the modeled EM field components may comprise a ratio of a modeled radial electric field component to a modeled azimuthal electric field component. The one or more ratios of the actual EM field components may comprise a ratio of an actual radial electric field component to an actual azimuthal electric field component. The ratios of modeled and actual radial and azimuthal electric field components may be less affected, relative to the modeled and actual radial and azimuthal electronic field components alone, by the modeled and actual existence of a conductive casing lining at least a portion of the borehole.

In related implementations in which the at least one EM source is positioned in a borehole and the at least one EM receiver is positioned at the Earth's surface, the one or more ratios of the modeled EM field components may comprise a ratio of a modeled vertical electric field component to a modeled vertical magnetic field component, and the one or more ratios of the actual EM field components may comprise a ratio of an actual vertical electric field component to an actual vertical magnetic field component. The ratios of modeled and actual vertical electric and vertical magnetic field components may be less affected, relative to the modeled and actual vertical electric and vertical magnetic field components alone, by the modeled and actual existence of one or more karsts located in a signal path between the at least one EM source and the at least one EM receiver.

In related implementations in which the at least one EM source is positioned in a borehole and the at least one EM receiver is positioned at the Earth's surface, the one or more ratios of the modeled EM field components may comprise a ratio of a modeled azimuthal electric field component to a modeled vertical magnetic field component, and the one or more ratios of the actual EM field components may comprise a ratio of an actual azimuthal electric field component to an actual vertical magnetic field component. The ratios of modeled and actual azimuthal electric and vertical magnetic field components may be less affected, relative to the modeled and actual azimuthal electric and vertical magnetic field components alone, by the modeled and actual existence of one or more karsts located in a signal path between the at least one EM source and the at least one EM receiver.

In related implementations in which the at least one EM source is positioned in a borehole and the at least one EM receiver is positioned at the Earth's surface, the one or more ratios of the modeled EM field components may comprise a ratio of a modeled vertical electric field component to a modeled azimuthal magnetic field component, and the one or more ratios of the actual EM field components may comprise a ratio of an actual vertical electric field component to an actual azimuthal magnetic field component. The ratios of modeled and actual vertical electric and azimuthal magnetic field components may be less affected, relative to the modeled and actual vertical electric and azimuthal magnetic field components alone, by the modeled and actual existence of one or more karsts located in a signal path between the at least one EM source and the at least one EM receiver.

In related implementations in which the at least one EM source is positioned in a borehole and the at least one EM receiver is positioned at the Earth's surface, the one or more ratios of the modeled EM field components may comprise a ratio of a modeled vertical electrical field component to a modeled vertical magnetic field component, and the one or more ratios of the actual EM field components may comprise a ratio of an actual vertical electrical field component to an actual vertical magnetic field component. The ratios of modeled and actual vertical electrical and magnetic field components may be less affected, relative to the modeled and actual vertical electrical and magnetic field components alone, by the modeled and actual existence of overburden within the subterranean formation in a signal path between the at least one EM source and the at least one EM receiver.

In some implementations, the at least one EM source may be positioned at the Earth's surface, and the at least one EM receiver may be positioned in a borehole extending into the subterranean formation. The one or more ratios of the modeled EM field components may comprise a ratio of a modeled vertical electrical field component to a modeled vertical magnetic field component, and the one or more ratios of the actual EM field components may comprise a ratio of an actual vertical electrical field component to an actual vertical magnetic field component. The ratios of modeled and actual vertical electrical and magnetic field components may be less affected, relative to the modeled and actual vertical electrical and magnetic field components alone, by the modeled and actual existence of a conductive casing lining at least a portion of the borehole.

In related implementations in which the at least one EM source is positioned at the Earth's surface and the at least one EM receiver is positioned in a borehole, the one or more ratios of the modeled EM field components may comprise a ratio of a modeled vertical electrical field component to a modeled vertical magnetic field component, and the one or more ratios of the actual EM field components may comprise a ratio of an actual vertical electrical field component to an actual vertical magnetic field component. The ratios of modeled and actual vertical electrical and magnetic field components may be less affected, relative to the modeled and actual vertical electrical and magnetic field components alone, by the modeled and actual existence of one or more karsts located in a signal path between the at least one EM source and the at least one EM receiver.

In related implementations in which the at least one EM source is positioned at the Earth's surface and the at least one EM receiver is positioned in a borehole, the one or more ratios of the modeled EM field components may comprise a ratio of a modeled azimuthal electrical field component to a modeled vertical magnetic field component, and the one or more ratios of the actual EM field components may comprise a ratio of an actual azimuthal electrical field component to an actual vertical magnetic field component. The ratios of modeled and actual azimuthal electrical and vertical magnetic field components may be less affected, relative to the modeled and actual azimuthal electrical and vertical magnetic field components alone, by the modeled and actual existence of one or more karsts located in a signal path between the at least one EM source and the at least one EM receiver.

In related implementations in which the at least one EM source is positioned at the Earth's surface and the at least one EM receiver is positioned in a borehole, the one or more ratios of the modeled EM field components may comprise a ratio of a modeled vertical electrical field component to a modeled azimuthal magnetic field component, and the one or more ratios of the actual EM field components may comprise a ratio of an actual vertical electrical field component to an actual azimuthal magnetic field component. The ratios of modeled and actual vertical electrical and azimuthal magnetic field components may be less affected, relative to the modeled and actual vertical electrical and azimuthal magnetic field components alone, by the modeled and actual existence of one or more karsts located in a signal path between the at least one EM source and the at least one EM receiver.

In related implementations in which the at least one EM source is positioned at the Earth's surface and the at least one EM receiver is positioned in a borehole, the one or more ratios of the modeled EM field components may comprise a ratio of a modeled vertical electrical field component to a modeled vertical magnetic field component, and the one or more ratios of the actual EM field components may comprise a ratio of an actual vertical electrical field component to an actual vertical magnetic field component. The ratios of modeled and actual vertical electrical and magnetic field components may be less affected, relative to the modeled and actual vertical electrical and magnetic field components alone, by the modeled and actual existence of overburden within the subterranean formation in a signal path between the at least one EM source and the at least one EM receiver.

In some implementations, the at least one EM source and the at least one EM receiver may be positioned at the Earth's surface. The one or more ratios of the modeled EM field components may comprise a ratio of a modeled radial electrical field component to a modeled azimuthal magnetic field component, and the one or more ratios of the actual EM field components may comprise a ratio of an actual radial electrical field component to an actual azimuthal magnetic field component. The ratios of modeled and actual radial electrical and azimuthal magnetic field components may be less affected, relative to the modeled and actual radial electrical and azimuthal magnetic field components alone, by the modeled and actual existence of one or more karsts located in a signal path between the at least one EM source and the at least one EM receiver.

The present disclosure also introduces an apparatus comprising: an electromagnetic (EM) apparatus associated with a subterranean formation and comprising at least one EM source and at least one EM receiver, wherein the at least one EM source is operable to emit an EM signal into the subterranean formation, and wherein the at least one EM receiver is operable to measure actual EM field components resulting from the EM signal traversing the subterranean formation; and an electronic device operable to: model expected EM field components to be measured by the EM apparatus; determine one or more ratios of the modeled EM field components; compare the one or more ratios of the modeled EM field components with one or more ratios of actual EM field components measured by the at least one EM receiver; and update the one or more ratios of the modeled EM field components based on the comparison.

The at least one EM source may be positioned in a first borehole extending into the subterranean formation, the at least one EM receiver may be positioned in a borehole extending into the subterranean formation, and the at least one EM source may be or comprise at least one magnetic dipole transmitter.

The at least one EM source and the at least one EM receiver may be collectively positioned in a single borehole extending into the subterranean formation, and the at least one EM source may be or comprise at least one magnetic dipole transmitter.

The at least one EM source may be positioned in a borehole extending into the subterranean formation, the at least one EM receiver may be positioned at the Earth's surface, and the at least one EM source may be or comprise at least one magnetic dipole transmitter. The one or more ratios of the modeled EM field components may comprise a ratio of a modeled radial electric field component to a modeled azimuthal electric field component, and the one or more ratios of the actual EM field components may comprise a ratio of an actual radial electric field component to an actual azimuthal electric field component. The at least one EM source may be or comprise at least one of a three-component electric dipole detector and a three-component magnetic dipole detector.

The one or more ratios of the modeled EM field components may comprise a ratio of a modeled vertical electric field component to a modeled vertical magnetic field component, and the one or more ratios of the actual EM field components may comprise a ratio of an actual vertical electric field component to an actual vertical magnetic field component. The at least one EM source may be or comprise at least one of a three-component electric dipole detector and a three-component magnetic dipole detector.

The one or more ratios of the modeled EM field components may comprise a ratio of a modeled azimuthal electric field component to a modeled vertical magnetic field component, and the one or more ratios of the actual EM field components may comprise a ratio of an actual azimuthal electric field component to an actual vertical magnetic field component. The at least one EM source may be or comprise at least one of a three-component electric dipole detector and a three-component magnetic dipole detector.

The one or more ratios of the modeled EM field components may comprise a ratio of a modeled vertical electric field component to a modeled azimuthal magnetic field component, and the one or more ratios of the actual EM field components may comprise a ratio of an actual vertical electric field component to an actual azimuthal magnetic field component. The at least one EM source may be or comprise at least one of a three-component electric dipole detector and a three-component magnetic dipole detector.

The one or more ratios of the modeled EM field components may comprise a ratio of a modeled vertical electrical field component to a modeled vertical magnetic field component, and the one or more ratios of the actual EM field components may comprise a ratio of an actual vertical electrical field component to an actual vertical magnetic field component. The at least one EM source may be or comprise at least one of a three-component electric dipole detector and a three-component magnetic dipole detector.

The at least one EM source may be positioned at the Earth's surface, and the at least one EM receiver may be positioned in a borehole extending into the subterranean formation. The at least one EM source may be or comprise at least one grounded wire transmitter. The one or more ratios of the modeled EM field components may comprise a ratio of a modeled vertical electrical field component to a modeled vertical magnetic field component, and the one or more ratios of the actual EM field components may comprise a ratio of an actual vertical electrical field component to an actual vertical magnetic field component. The at least one EM source may be or comprise at least one of a three-component electric dipole detector and a three-component magnetic dipole detector.

The one or more ratios of the modeled EM field components may comprise a ratio of a modeled azimuthal electrical field component to a modeled vertical magnetic field component, and the one or more ratios of the actual EM field components comprises a ratio of an actual azimuthal electrical field component to an actual vertical magnetic field component. The at least one EM source may be or comprise at least one of a three-component electric dipole detector and a three-component magnetic dipole detector.

The one or more ratios of the modeled EM field components may comprise a ratio of a modeled vertical electrical field component to a modeled azimuthal magnetic field component, and the one or more ratios of the actual EM field components may comprise a ratio of an actual vertical electrical field component to an actual azimuthal magnetic field component. The at least one EM source may be or comprise at least one of a three-component electric dipole detector and a three-component magnetic dipole detector.

The one or more ratios of the modeled EM field components may comprise a ratio of a modeled vertical electrical field component to a modeled vertical magnetic field component, and the one or more ratios of the actual EM field components may comprise a ratio of an actual vertical electrical field component to an actual vertical magnetic field component. The at least one EM source may be or comprise at least one of a three-component electric dipole detector and a three-component magnetic dipole detector.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to permit the reader to quickly ascertain the nature of the technical disclosure. It is submitted with the understanding that it will not be used to interpret or limit the scope or meaning of the claims.

What is claimed is:

1. A method, comprising:
   operating an electronic device to model expected electromagnetic (EM) field components to be measured by an EM apparatus associated with a subterranean formation, wherein the EM apparatus comprises at least one EM source and at least one EM receiver;
   operating the electronic device to determine one or more ratios of the modeled EM field components;
   operating the at least one EM source to emit an EM signal into the subterranean formation, and operating the at least one EM receiver to measure actual EM field components of the EM signal;
   operating the electronic device to compare the one or more ratios of the modeled EM field components with one or more ratios of the actual EM field components; and
   updating the one or more ratios of the modeled EM field components based on the comparison.

2. The method of claim 1 wherein:
   the at least one EM source is positioned in a borehole extending into the subterranean formation;
   the at least one EM receiver positioned at the Earth's surface;

the one or more ratios of the modeled EM field components comprises a ratio of a modeled radial electric field component to a modeled azimuthal electric field component; and the one or more ratios of the actual EM field components comprises a ratio of an actual radial electric field component to an actual azimuthal electric field component.

3. The method of claim 1 wherein:

the at least one EM source is positioned in a borehole extending into the subterranean formation;

the at least one EM receiver is positioned at the Earth's surface;

the one or more ratios of the modeled EM field components comprises a ratio of a modeled vertical electric field component to a modeled vertical magnetic field component; and the one or more ratios of the actual EM field components comprises a ratio of an actual vertical electric field component to an actual vertical magnetic field component.

4. The method of claim 1 wherein:

the at least one EM source is positioned in a borehole extending into the subterranean formation;

the at least one EM receiver positioned at the Earth's surface;

the one or more ratios of the modeled EM field components comprises a ratio of a modeled azimuthal electric field component to a modeled vertical magnetic field component; and the one or more ratios of the actual EM field components comprises a ratio of an actual azimuthal electric field component to an actual vertical magnetic field component.

5. The method of claim 1 wherein:

the at least one EM source is positioned in a borehole extending into the subterranean formation;

the at least one EM receiver positioned at the Earth's surface;

the one or more ratios of the modeled EM field components comprises a ratio of a modeled vertical electric field component to a modeled azimuthal magnetic field component; and the one or more ratios of the actual EM field components comprises a ratio of an actual vertical electric field component to an actual azimuthal magnetic field component.

6. The method of claim 1 wherein:

the at least one EM source is positioned at the Earth's surface;

the at least one EM receiver is positioned in a borehole extending into the subterranean formation;

the one or more ratios of the modeled EM field components comprises a ratio of a modeled vertical electrical field component to a modeled vertical magnetic field component; and the one or more ratios of the actual EM field components comprises a ratio of an actual vertical electrical field component to an actual vertical magnetic field component.

7. The method of claim 1 wherein:

the at least one EM source is positioned at the Earth's surface;

the at least one EM receiver is positioned in a borehole extending into the subterranean formation;

the one or more ratios of the modeled EM field components comprises a ratio of a modeled azimuthal electrical field component to a modeled vertical magnetic field component; and the one or more ratios of the actual EM field components comprises a ratio of an actual azimuthal electrical field component to an actual vertical magnetic field component.

8. The method of claim 1 wherein:

the at least one EM source is positioned at the Earth's surface;

the at least one EM receiver is positioned in a borehole extending into the subterranean formation;

the one or more ratios of the modeled EM field components comprises a ratio of a modeled vertical electrical field component to a modeled azimuthal magnetic field component; and the one or more ratios of the actual EM field components comprises a ratio of an actual vertical electrical field component to an actual azimuthal magnetic field component.

9. The method of claim 1 wherein:

the at least one EM source and the at least one EM receiver are positioned at the Earth's surface;

the one or more ratios of the modeled EM field components comprises a ratio of a modeled radial electrical field component to a modeled azimuthal magnetic field component; and the one or more ratios of the actual EM field components comprises a ratio of an actual radial electrical field component to an actual azimuthal magnetic field component.

10. An apparatus, comprising:

an electromagnetic (EM) apparatus associated with a subterranean formation and comprising at least one EM source and at least one EM receiver, wherein the at least one EM source is operable to emit an EM signal into the subterranean formation, and wherein the at least one EM receiver is operable to measure actual EM field components resulting from the EM signal traversing the subterranean formation; and an electronic device operable to:

model expected EM field components to be measured by the EM apparatus;

determine one or more ratios of the modeled EM field components;

compare the one or more ratios of the modeled EM field components with one or more ratios of actual EM field components measured by the at least one EM receiver; and update the one or more ratios of the modeled EM field components based on the comparison.

11. The apparatus of claim 10 wherein:

the at least one EM source is positioned in a first borehole extending into the subterranean formation;

the at least one EM receiver is positioned in a second borehole extending into the subterranean formation; and the at least one EM source is or comprises at least one magnetic dipole transmitter.

12. The apparatus of claim 10 wherein:

the at least one EM source and the at least one EM receiver are collectively positioned in a single borehole extending into the subterranean formation; and the at least one EM source is or comprises at least one magnetic dipole transmitter.

13. The apparatus of claim 10 wherein:

the at least one EM source is positioned in a borehole extending into the subterranean formation;

the at least one EM receiver is positioned at the Earth's surface;

the at least one EM source is or comprises at least one magnetic dipole transmitter;

the one or more ratios of the modeled EM field components comprises a ratio of a modeled radial electric field component to a modeled azimuthal electric field component; and the one or more ratios of the actual EM field components comprises a ratio of an actual radial electric field component to an actual azimuthal electric field component.

14. The apparatus of claim 10 wherein:

the at least one EM source is positioned in a borehole extending into the subterranean formation;

the at least one EM receiver is positioned at the Earth's surface;

the at least one EM source is or comprises at least one magnetic dipole transmitter;

the one or more ratios of the modeled EM field components comprises a ratio of a modeled vertical electric field component to a modeled vertical magnetic field component; and the one or more ratios of the actual EM field components comprises a ratio of an actual vertical electric field component to an actual vertical magnetic field component.

15. The apparatus of claim 10 wherein:

the at least one EM source is positioned in a borehole extending into the subterranean formation;

the at least one EM receiver is positioned at the Earth's surface;

the at least one EM source is or comprises at least one magnetic dipole transmitter;

the one or more ratios of the modeled EM field components comprises a ratio of a modeled azimuthal electric field component to a modeled vertical magnetic field component; and the one or more ratios of the actual EM field components comprises a ratio of an actual azimuthal electric field component to an actual vertical magnetic field component.

16. The apparatus of claim 10 wherein:

the at least one EM source is positioned in a borehole extending into the subterranean formation;

the at least one EM receiver is positioned at the Earth's surface;

the at least one EM source is or comprises at least one magnetic dipole transmitter;

the one or more ratios of the modeled EM field components comprises a ratio of a modeled vertical electric field component to a modeled azimuthal magnetic field component; and the one or more ratios of the actual EM field components comprises a ratio of an actual vertical electric field component to an actual azimuthal magnetic field component.

17. The apparatus of claim 10 wherein:

the at least one EM source is positioned at the Earth's surface;

the at least one EM receiver is positioned in a borehole extending into the subterranean formation;

the at least one EM source is or comprises at least one grounded wire transmitter;

the one or more ratios of the modeled EM field components comprises a ratio of a modeled vertical electrical field component to a modeled vertical magnetic field component; and the one or more ratios of the actual EM field components comprises a ratio of an actual vertical electrical field component to an actual vertical magnetic field component.

18. The apparatus of claim 10 wherein:

the at least one EM source is positioned at the Earth's surface;

the at least one EM receiver is positioned in a borehole extending into the subterranean formation;

the at least one EM source is or comprises at least one grounded wire transmitter;

the one or more ratios of the modeled EM field components comprises a ratio of a modeled azimuthal electrical field component to a modeled vertical magnetic field component; and the one or more ratios of the actual EM field components comprises a ratio of an actual azimuthal electrical field component to an actual vertical magnetic field component.

19. The apparatus of claim 10 wherein:

the at least one EM source is positioned at the Earth's surface;

the at least one EM receiver is positioned in a borehole extending into the subterranean formation;

the at least one EM source is or comprises at least one grounded wire transmitter;

the one or more ratios of the modeled EM field components comprises a ratio of a modeled vertical electrical field component to a modeled azimuthal magnetic field component; and the one or more ratios of the actual EM field components comprises a ratio of an actual vertical electrical field component to an actual azimuthal magnetic field component.

20. The apparatus of claim 10 wherein:

the at least one EM source and the at least one EM receiver are positioned at the Earth's surface;

the one or more ratios of the modeled EM field components comprises a ratio of a modeled radial electrical field component to a modeled azimuthal magnetic field component; and the one or more ratios of the actual EM field components comprises a ratio of an actual radial electrical field component to an actual azimuthal magnetic field component.

* * * * *